(12) United States Patent
Watanabe

(10) Patent No.: US 9,990,106 B2
(45) Date of Patent: Jun. 5, 2018

(54) ELECTRONIC DEVICE, MENU DISPLAY METHOD AND STORAGE MEDIUM

(71) Applicant: KABUSHIKI KAISHA TOSHIBA, Minato-ku, Tokyo (JP)

(72) Inventor: Satoshi Watanabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 607 days.

(21) Appl. No.: 14/634,650

(22) Filed: Feb. 27, 2015

(65) Prior Publication Data

US 2015/0177930 A1   Jun. 25, 2015

Related U.S. Application Data

(63) Continuation of application No. PCT/JP2013/058502, filed on Mar. 25, 2013.

(51) Int. Cl.
*G06F 3/0482* (2013.01)
*G06F 3/0481* (2013.01)

(52) U.S. Cl.
CPC ........ *G06F 3/0482* (2013.01); *G06F 3/04812* (2013.01)

(58) Field of Classification Search
CPC .................................................... G06F 3/0482
USPC ....................................................... 715/828
See application file for complete search history.

(56) References Cited

U.S. PATENT DOCUMENTS

| 6,175,840 B1* | 1/2001 | Chen ................. G06F 17/30014 707/E17.013 |
| 8,719,729 B2* | 5/2014 | Smith .................... G06F 3/0488 715/789 |
| 9,071,798 B2* | 6/2015 | Hoffert .............. H04N 5/44591 |
| 9,152,317 B2* | 10/2015 | Larco ..................... G06F 3/0482 |
| 9,727,212 B2* | 8/2017 | Noyau ................... G06F 3/0483 |

(Continued)

FOREIGN PATENT DOCUMENTS

| JP | H10-187402 A | 7/1998 |
| JP | 2000-209520 A | 7/2000 |

(Continued)

OTHER PUBLICATIONS

An English Translation of Written Opinion mailed by the International Bureau of WIPO dated Oct. 8, 2015 in the corresponding PCT Application No. PCT/JP2013/058502—6 pages.

(Continued)

*Primary Examiner* — Reza Nabi
(74) *Attorney, Agent, or Firm* — Knobbe, Martens, Olson & Bear, LLP

(57) ABSTRACT

According to one embodiment, an electronic device includes a display and circuitry. The circuitry displays a first menu in a first region of a screen. The circuitry determines whether a first operation is made and whether a second operation is made. The first operation is to move a pointing location from inside of the first region into a second region. The second operation is to move a pointing location from outside of the first region into the second region. The circuitry halts display of a second menu on the second region when the first operation is determined, and displays the second menu on the second region when the second operation is determined.

5 Claims, 10 Drawing Sheets

(56) References Cited

U.S. PATENT DOCUMENTS

| | | | | |
|---|---|---|---|---|
| 2002/0040474 A1* | 4/2002 | Ohkita | ............... | H04N 5/44504 |
| | | | | 725/37 |
| 2003/0081931 A1* | 5/2003 | Nanba | ................ | H04N 5/44513 |
| | | | | 386/332 |
| 2004/0130576 A1* | 7/2004 | Fujita | .................... | G06F 3/0481 |
| | | | | 715/781 |
| 2011/0016390 A1* | 1/2011 | Oh | ........................ | G06F 3/0482 |
| | | | | 715/702 |
| 2011/0242002 A1* | 10/2011 | Kaplan | ............... | G06F 3/04883 |
| | | | | 345/173 |
| 2014/0123077 A1* | 5/2014 | Kutliroff | ................. | G06F 3/017 |
| | | | | 715/863 |
| 2014/0344697 A1* | 11/2014 | Liu | ..................... | G06F 3/04883 |
| | | | | 715/720 |
| 2014/0344738 A1* | 11/2014 | Lai | ........................ | G06F 3/0482 |
| | | | | 715/769 |
| 2014/0375862 A1* | 12/2014 | Kim | ................... | H04N 5/23245 |
| | | | | 348/333.02 |
| 2015/0177930 A1* | 6/2015 | Watanabe | ........... | G06F 3/04812 |
| | | | | 715/828 |
| 2016/0042166 A1* | 2/2016 | Kang | ...................... | G06F 21/32 |
| | | | | 726/7 |
| 2017/0217593 A1* | 8/2017 | Ishida | .................... | B64D 15/04 |

FOREIGN PATENT DOCUMENTS

| | | |
|---|---|---|
| JP | 2002-108326 A | 4/2002 |
| JP | 2003-131656 A | 5/2003 |
| JP | 2004-080276 A | 3/2004 |
| JP | 2004-212857 A | 7/2004 |
| JP | 2009-093260 A | 4/2009 |
| JP | 2012-128652 | 7/2012 |

OTHER PUBLICATIONS

International Search Report dated May 14, 2013 in Int'l Application No. PCT/JP2013/058502, 5 pages.

* cited by examiner

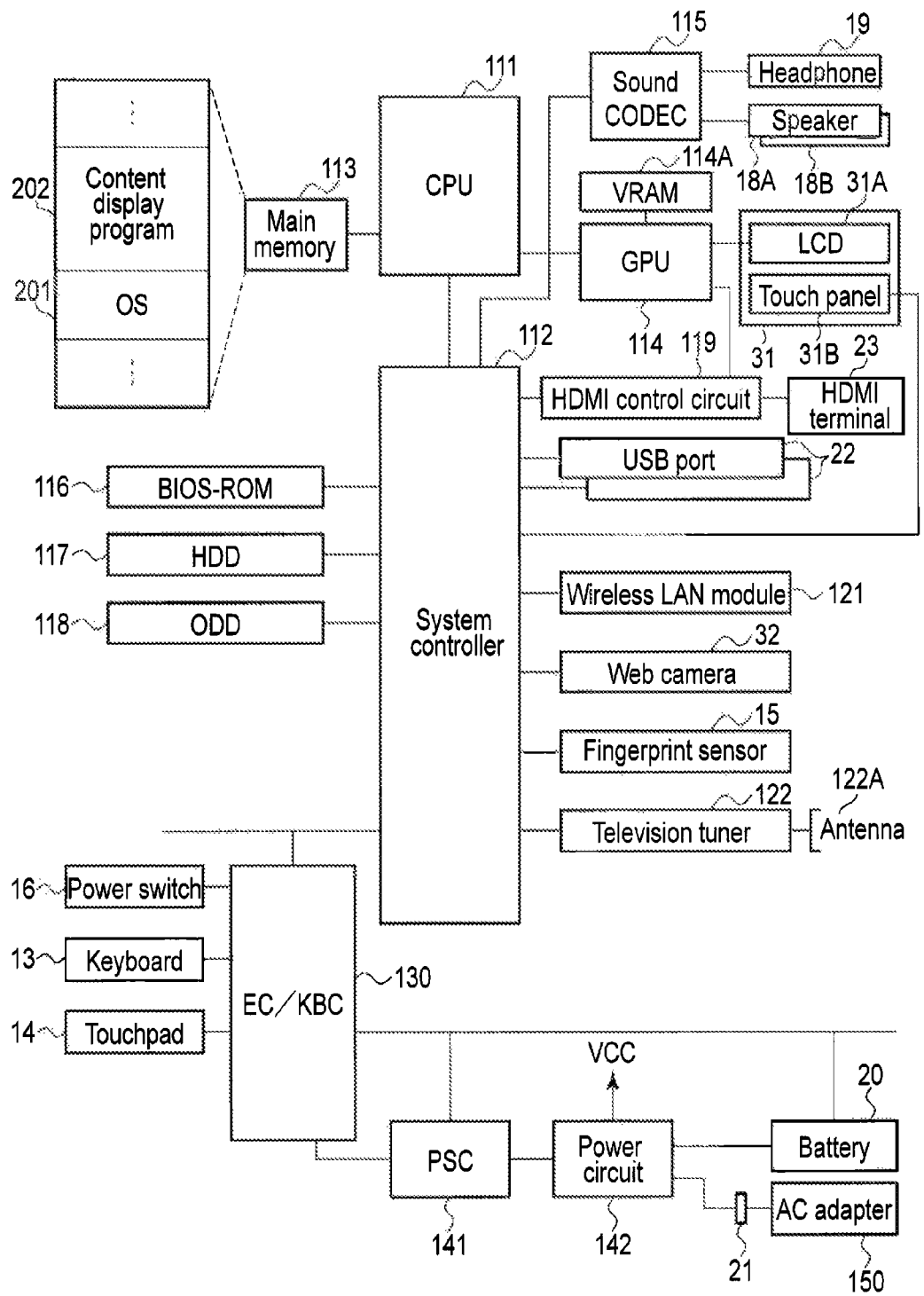
F I G. 2

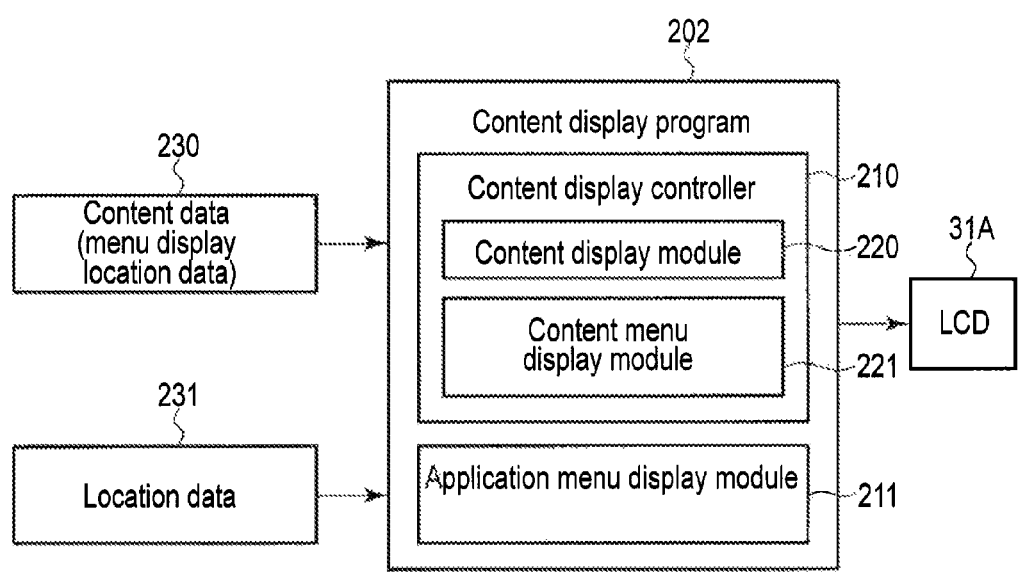
F I G. 3

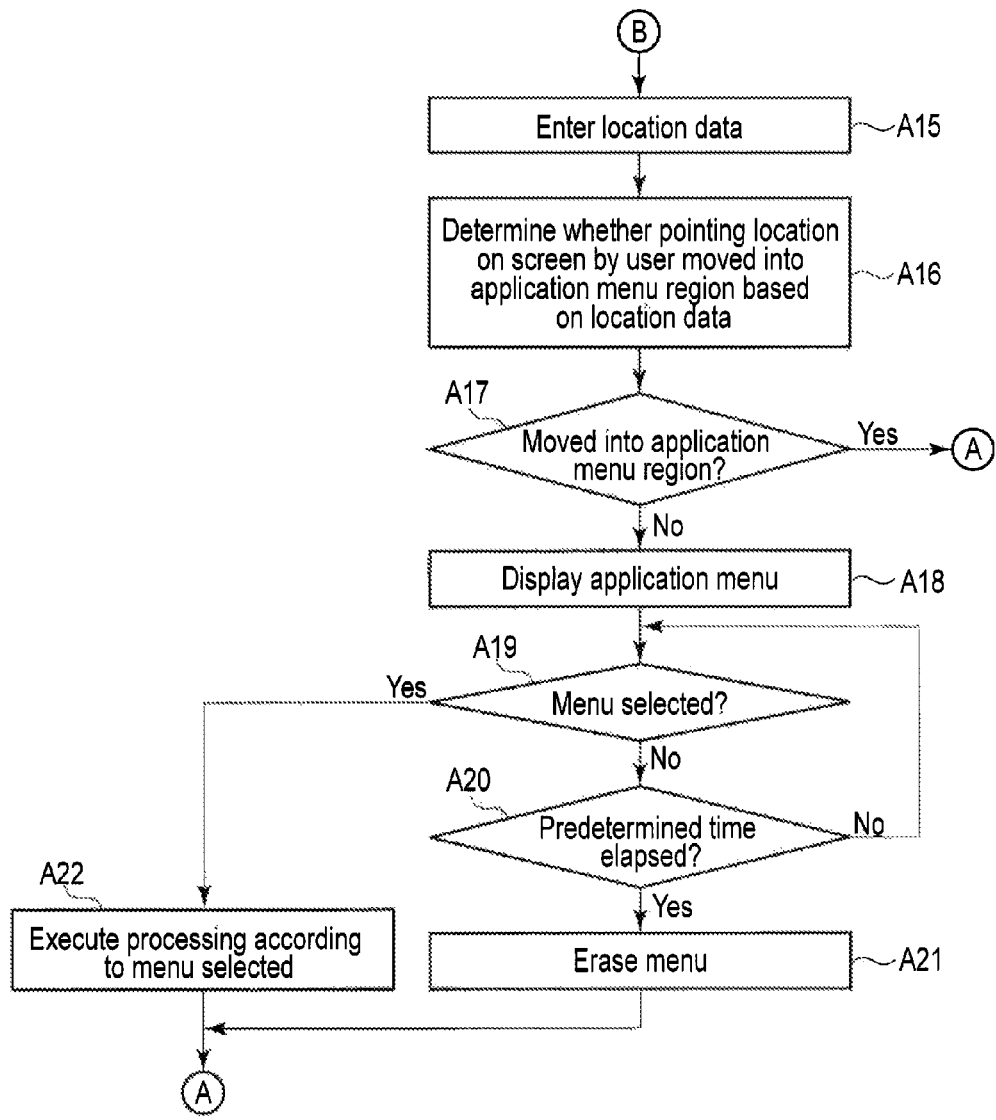
F I G. 5

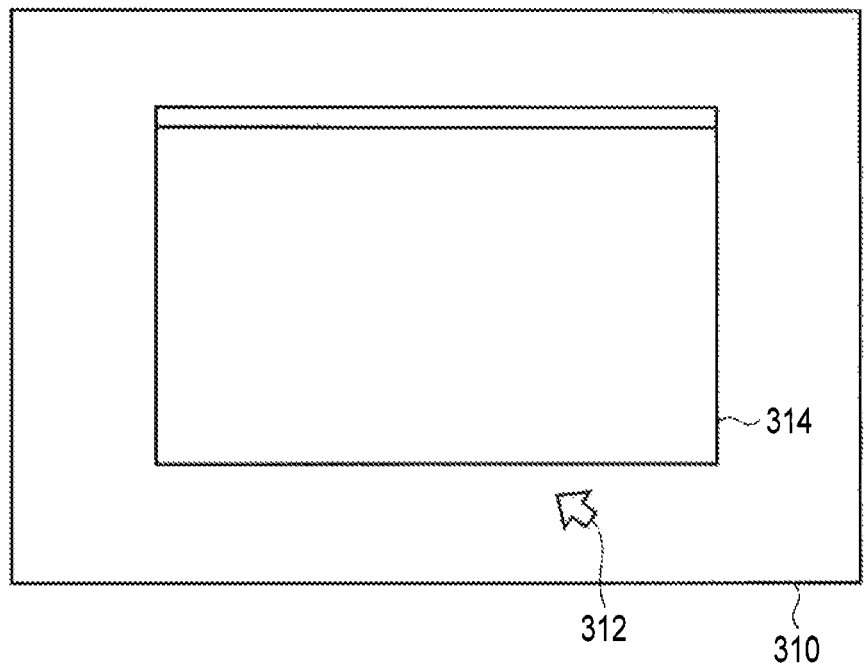
F I G. 6
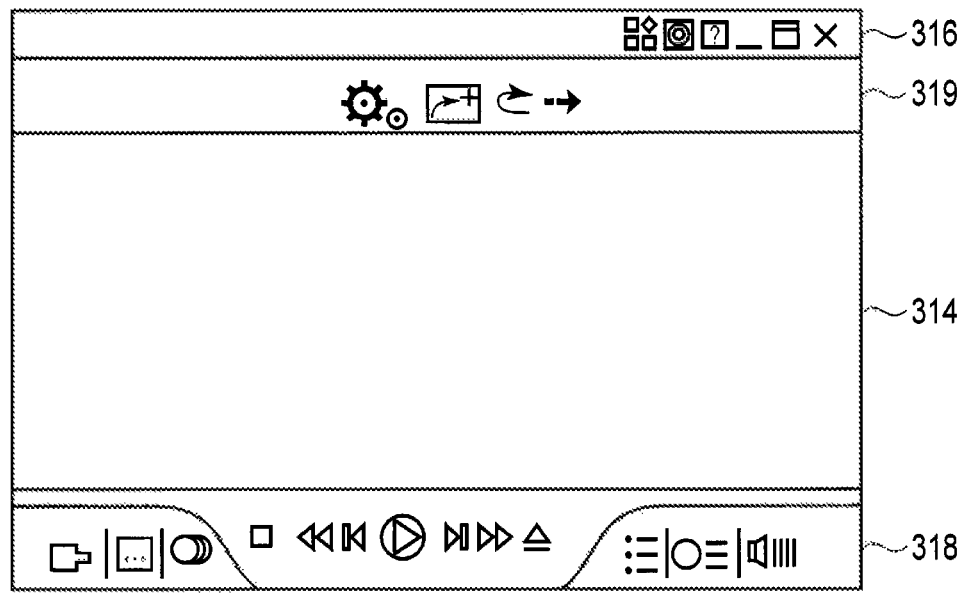
F I G. 7

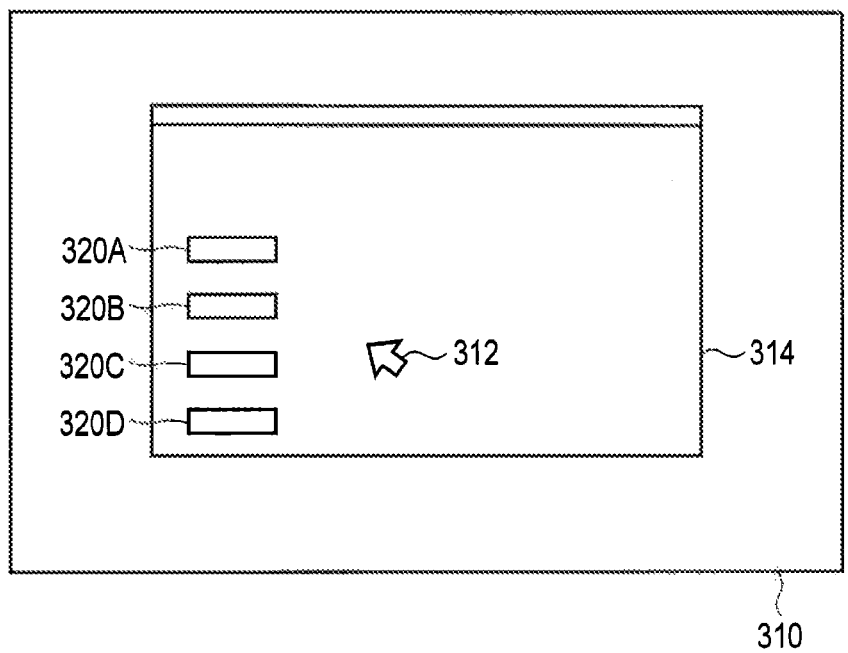
F I G. 10
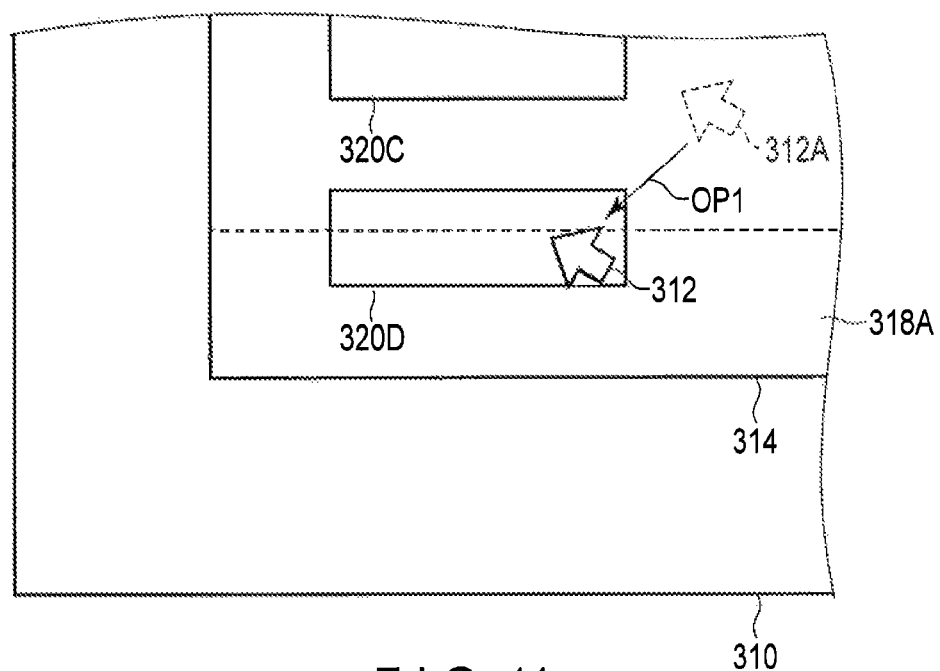
F I G. 11

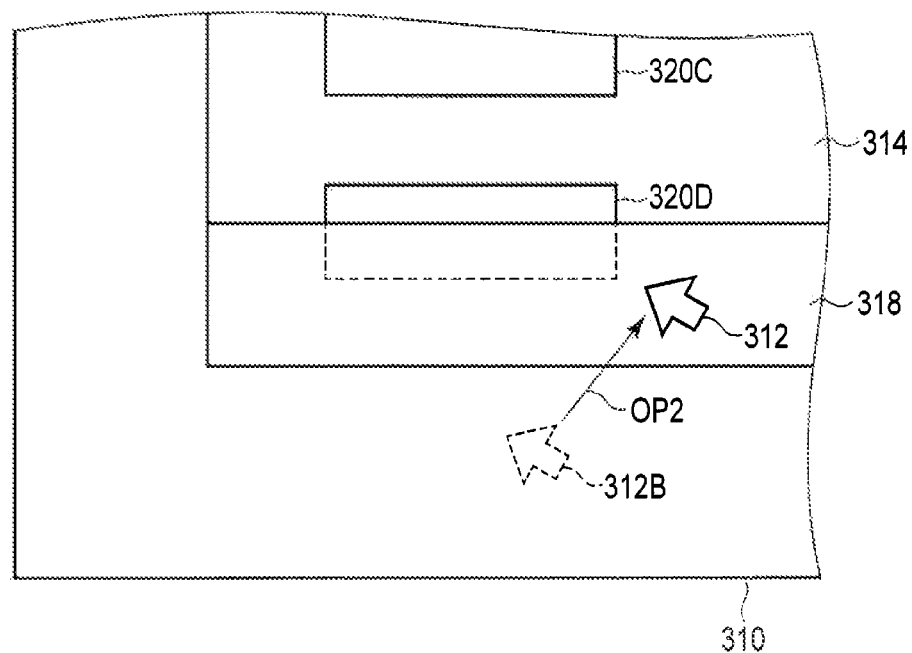
F I G. 12
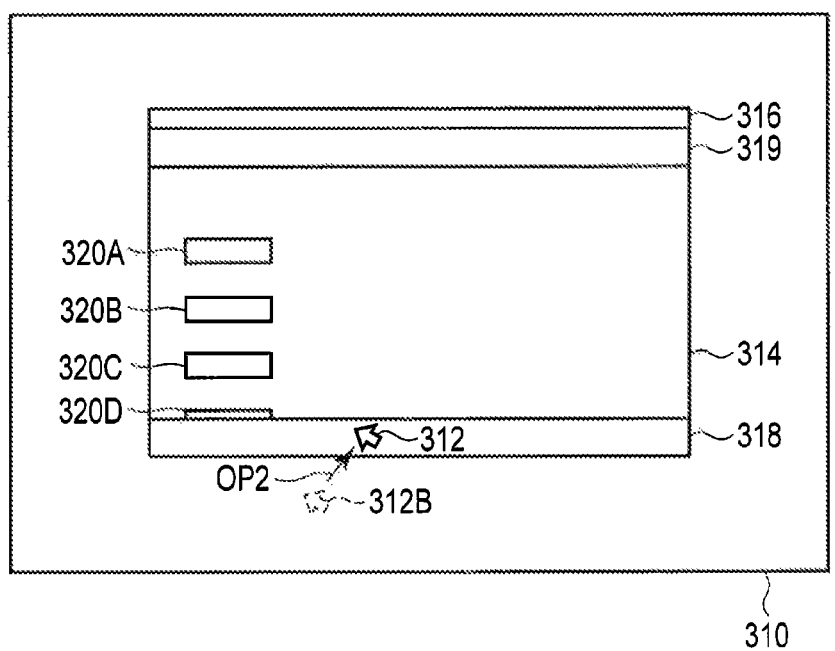
F I G. 13

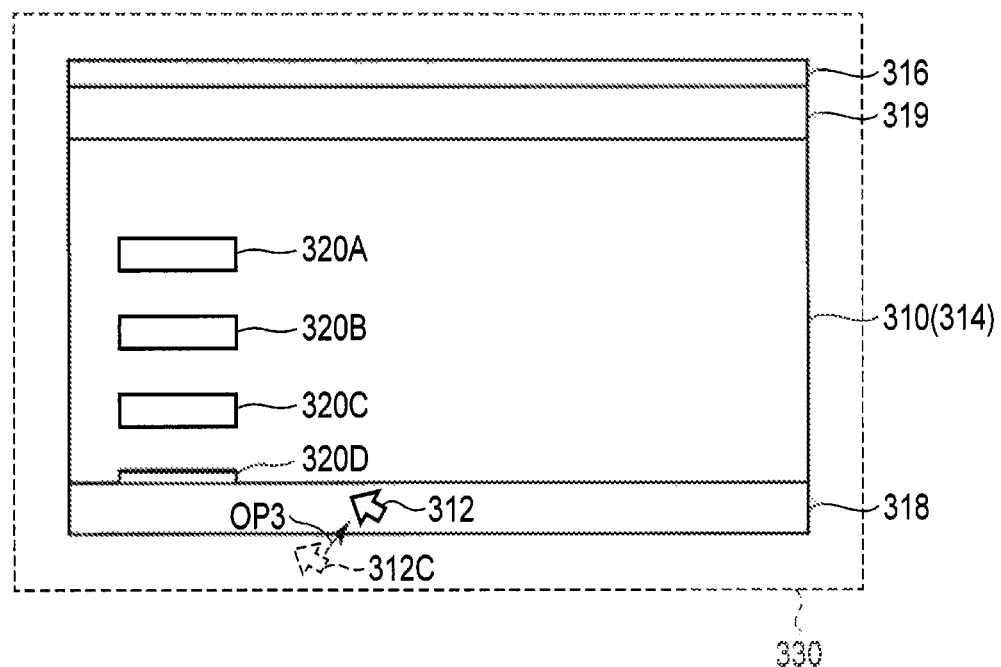
F I G. 14

ELECTRONIC DEVICE, MENU DISPLAY METHOD AND STORAGE MEDIUM

CROSS REFERENCE TO RELATED APPLICATIONS

This application is a Continuation Application of PCT Application No. PCT/JP2013/058502, filed Mar. 25, 2013, the entire contents of which are incorporated herein by reference.

FIELD

Embodiments described herein relate generally to an electronic device, a menu display method and a storage medium.

BACKGROUND

An electronic device such as a personal computer, when reproducing and outputting contents recorded on a storage medium such as Blu-ray or Digital Versatile Disc (DVD), executes a program for reproducing content. By the content reproduction program, the content data recorded on a storage medium are read, in order to display the image on a content display region provided on a display screen, and output sound from a speaker or the like.

The content recorded on a storage medium such as Blu-ray or DVD contain a menu (hereinafter referred to as a content menu) used to select content to be reproduced, or set a type of dubbing (language, etc.) and presence/absence of subtitles, or the like. The content reproduction program displays the contents menu on the content display region in response to an instruction entered by the user to display the menu, or at a timing predetermined by the content to display the menu. The content menu includes a plurality of menu items. The user can select a desired menu item by operating a pointing device or the like to point the cursor at the location of the menu item.

Meanwhile, the content reproduction program contains a menu (hereinafter referred to as an application menu) used to control the content output and set and adjust various functions. When a content is being displayed, the application menu is usually not displayed unless the user operates the pointing device or the like, in order to avoid blocking on the display of the content. The application menu is, when, for example, the cursor is moved by the user with the pointing device or the like, displayed at a predetermined location in the content display region.

Conventionally, display of a content menu and that of an application menu are separately controlled. Therefore, the application menu is in some cases displayed in response to the operation of a pointing device or the like, while the content menu being displayed in the content display region. In the contents menu, the locations of menu items are determined in each content regardless of a program used for reproduction and output. With the fixed locations, when the application menu is displayed, menu items of the content menu are hidden behind the application menu in some cases, which makes it difficult for the user to operate to select a desired item on the content menu.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary diagram showing a system configuration of a personal computer according to the embodiment.

FIG. 3 is an exemplary diagram showing an example of a functional module realized by a content display program according to the embodiment.

FIG. 5 is an exemplary second flowchart for describing the display control of the application menu according to the embodiment.

FIG. 6 is an exemplary diagram showing an example of a display of a content display control module when it is launched in the embodiment.

FIG. 7 is an exemplary diagram showing an example of a display of a content display region in which an application menu is displayed.

FIG. 10 is an exemplary diagram showing an example in which a content menu is displayed in the embodiment.

FIG. 11 is an exemplary diagram showing an example of the case where a first operation is carried out while the content menu is being displayed in the embodiment.

FIG. 12 is an exemplary diagram showing an example of the case where a second operation is carried out while the content menu is being displayed in the embodiment.

FIG. 13 is an exemplary diagram showing an example of display of application menus in the embodiment.

FIG. 14 is an exemplary diagram showing an example in which the content display region is displayed on the entire screen in the embodiment.

DETAILED DESCRIPTION

Various embodiments will be described hereinafter with reference to the accompanying drawings.

In general, according to one embodiment, an electronic device comprises a display and circuitry. The circuitry is configured to display an image of a content or a first menu contained in the content in a first region of a screen of the display. The circuitry is further configured to determine whether a first operation is made and whether a second operation is made. The first operation is to move a pointing location from inside of the first region into a second region. The second operation is to move a pointing location from outside of the first region into the second region. The circuitry is further configured to halt display of a second menu on the second region when the first operation is determined, and to display the second menu on the second region when the second operation is determined.

Figure 1:
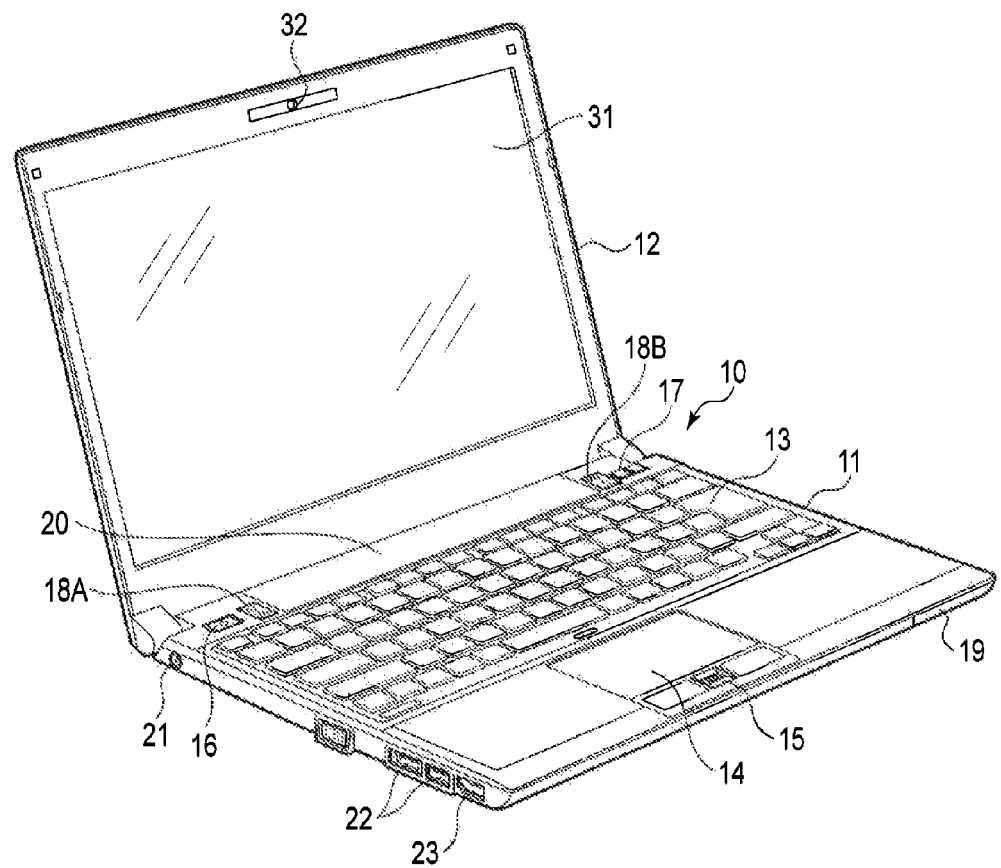
FIG. 1 is an exemplary view showing an exterior structure of an electronic device according to an embodiment.

FIG. 1 is an exemplary view showing an exterior structure of an electronic device according to an embodiment. The electronic device can be realized as various types of devices, for example, a notebook personal computer, a tablet computer, a desktop personal computer, an HDD recorder, etc. The following descriptions will be provided on the assumption that the electronic device is realized as a notebook personal computer 10.

FIG. 1 is an exemplary front perspective view of the personal computer 10 when the display unit is open. The personal computer 10 is configured to receive power from a battery 20. The personal computer 10 comprises a main body 11 and a touchscreen display unit 12. The touchscreen display unit 12 accommodates a touchscreen display 31 with which location (coordinate) data, which indicates a pointing location by a pen (stylus) or a fingertip, can be entered. The touchscreen display 31 comprises, for example, a liquid crystal display (LCD) 31A (see FIG. 2) as a flat panel display, and a touch panel 31B (see FIG. 2) configured to detect a pointing location by a stylus or a fingertip, which are stacked one on another. Further, the display unit 12 comprises a camera (web-cam) 32 in its upper edge.

The touchscreen display unit 12 is mounted to the main body 11 so as to be rotatable between an open position where an upper surface of the main body 11 is exposed and a closed position where the upper surface of the main body 11 is covered with the display unit 12. The main body 11 is a housing having a thin-walled box shape, on an upper surface of which, a keyboard 13, a touchpad 14, a fingerprint sensor 15, a power switch 16 to turn the personal computer 10 on/off, functional buttons 17 and speakers 18A and 18B are disposed.

The main body 11 is provided with a power connector 21. The power connector 21 is provided on a side surface, for example, a left-side surface, of the main body 11. To the power connector 21, an external power device is removably connected. An AC adaptor can be employed as the external power device. The AC adaptor is a power device to convert commercial power (AC power) into DC power.

The battery 20 is removably mounted to, for example, a rear end portion of the main body 11. The battery 20 may be built in the personal computer 10.

The personal computer 10 is driven by the power from the external power device or the battery 20. When an external power device is connected to the power connector 21 of the personal computer 10, the personal computer 10 is driven by the power from the external power device. Further, the power from the external power device is utilized also to charge the battery 20. While an external power device is not being connected to the power connector 21 of the personal computer 10, the personal computer 10 is driven by the power from the battery 20.

Further, the main body 11 is provided with USB ports 22, a High-Definition Multimedia Interface (HDMI) output terminal 23 and the like.

FIG. 2 shows a system configuration of the personal computer 10 of the embodiment. The personal computer 10 comprises a CPU 111, a system controller 112, a main memory 113, a graphic processing unit (GPU) 114, a sound codec 115, a BIOS-ROM 116, a hard disk drive (HDD) 117, an optical disc drive (ODD) 118, a wireless LAN module 121, a television tuner 122, an embedded controller/keyboard controller IC (EC/KBC) 130, a power supply controller (PSC) 141, a power circuit 142 and the like.

The CPU 111 is a processor configured to control operation of each component of the personal computer 10. The CPU 111 includes circuitry. The CPU 111 executes various programs loaded on the main memory 113 from the HDD 117. These programs include an operating system (OS) 201 and various types of application programs. The OS 201 displays a cursor on the LCD 31A in response to a user's operation on the touchpad 14 and moves the cursor on the screen according to location data detected when a touch operation is carried out.

The application program includes a content display program 202. The content display program 202 comprises a function of reproducing and outputting content based on content data. The content display program 202 reads content data from a storage medium such as a Blu-ray or DVD through the optical disc drive (ODD) 118, displays an image of the content based on the content data on LCD 31A through the GPU 114, and outputs voice from speakers 18A and 18B via the sound codec 115. The content display program 202 also displays the content menu based on menu data (content menu data) contained in the contents data, and executes a process corresponding to a menu item selected from the menu by the user's operation of the pointing device or touchscreen display 31.

The CPU 111 executes a basic input/output system (BIOS) stored in a BIOS-ROM 116, which is a non-volatile memory. The BIOS is a system program for controlling hardware.

The GPU 114 is a display controller which controls LCD 31A used as the display monitor of the personal computer 10. The GPU 114 generates a display signal (LVDS signal) to be supplied to LCD 31A from display data stored in a video memory (VRAM) 114A. Further, the GPU 114 can generate an analog RGB signal and an HDMI video signal from the display data. The HDMI output terminal 23 can transmit an HDMI video signal (uncompressed digital video signal) and a digital audio signal to an external display via one cable. A HDMI control circuit 119 is an interface for transmitting an HDMI video signal and a digital audio signal to an external display via the HDMI output terminal 23.

The system controller 112 is a bridge device which connects the CPU 111 and each component with each other. The system controller 112 comprises a built-in serial ATA controller for controlling the hard disk drive (HDD) 117 and the optical disc drive (ODD) 118. The system controller 112 also comprises a built-in controller for controlling touch panel 31B.

To the system controller 112, devices such as the USB ports 22, the wireless LAN module 121, the Web camera 32, the fingerprint sensor 15 and the television tuner 122 are connected. To each of the USB ports 22, some other pointing device such as a mouse can be connected.

To the television tuner 122, a television broadcast receiving antenna is connected via connector 122A. The television tuner 122 receives airwaves of television broadcasts via the antenna and outputs television broadcast signals.

Further, the system controller 112 executes communications with each device connected thereto via a bus.

The EC/KBC 130 is connected to the system controller 112 via a bus. The EC/KBC 130 is also connected to each of the power supply controller (PSC) 141, the power circuit 142 and the battery 20 via a serial bus.

The EC/KBC 130 is a power management controller which executes power management of the personal computer 10, and is realized as, for example, a single-chip microcomputer comprising a built-in keyboard controller to control a keyboard (KB) 13, a touchpad 14 and the like. The EC/KBC 130 comprises a function of turning-on/off of the personal computer 10 in response to the user's operation on the power switch 16. The control of power-on and power-off of the personal computer 10 is executed by the power supply controller (PSC) 141 and the EC/KBC 130 operating in collaboration with each other.

When receiving an ON signal transmitted from the EC/KBC 130, the power supply controller (PSC) 141 controls the power circuit 142 to turn on the personal computer 10. On the other hand, when receiving an OFF signal transmitted from the EC/KBC 130, the power supply controller (PSC) 141 controls the power circuit 142 to turn off the personal computer 10. The EC/KBC 130, the power supply controller (PSC) 141 and the power circuit 142 are in operation by the power from the battery 20 or AC adaptor 150 during the power of the personal computer 10 is off.

The power circuit 142 generates power (operation power source) to be supplied to each component by using the power from the battery 20 or the AC adaptor 150 connected as an external power source to the main body 11.

FIG. 3 is an exemplary diagram showing an example of a functional module realized by the content display program 202 according to the embodiment.

As shown in FIG. 3, the content display program 202 provides functions of a content display controller 210 and an application menu display module 211, by the program 202 is executed by the CPU 111. Note that the content display program 202 displays image and outputs voice based on the content data output, but the description on the function of outputting voice will be omitted.

The content display controller 210 reads content data recorded on a storage medium such as Blu-ray or DVD via, for example, the ODD 118 and displays the content in the content display region provided in the LCD 31A. The content display controller 210 comprises a content display module 220 which displays the main portion of the content on the content display region, and a content menu display module 221 which displays a content menu on the content display region. The content menu display module 221 displays the content menu based on the menu data (content menu data) contained in the content data. The content menu data contains data regarding a plurality of menu items to be displayed on the content menu. The data regarding the menu items also contain menu display location data indicating a region for accepting entry of a menu item of the content menu.

The content display controller 210 executes, when a menu item is selected by a user's operation in the content menu displayed on LCD 31A, processing corresponding to the selected menu item. In the case of content data of a movie, for example, the menu items contain selections for content to be reproduced and output, (that is, the "main part" of the movie, "bonus content", "introduction of other content", etc.), and settings of audio types (languages, etc.) and subtitles. For example, when the menu items corresponding to the "main part" is selected, the content display controller 210 controls the content display module 220 to reproduce and output the "main part".

The application menu display module 211 displays an application menu in a predetermined area of the content display region. The application menu is a menu for controlling content outputs, and setting and adjusting various types of functions. The application menu comprises, for example, a plurality of buttons. The buttons for controlling content outputs include those for instructing, for example, playback, stop, fast forward, fast reverse, chapter skip, reverse chapter skip, etc. The buttons for setting and adjusting various types of functions includes, for example, those for volume control and for instructing display of the content menu, etc.

The application menu display module 211 inputs location data 231 detected when the user operates on the touchpad 41 or touchscreen display 31 via, for example, the OS 201 (or device driver), and determines whether an entry which requires display of the application menu is made. The application menu display module 211 controls display of the application menu based on the entry determined based on the location data 231.

When content is being displayed by the content display controller 210, the application menu display module 211 does not display the application menu so to avoid blocking the display of the content as long as the touchpad 14 or touchscreen display 31 is not operated by the user. When it is determined based on the location data 231 that an entry to display the application menu is operated by the user, the application menu display module 211 displays the application menu at a predetermined location in the content display region. Further, the application menu display module 211 comprises a function of inhibiting, when the content menu is being displayed in the content display region, display of the application menu if the location of display of the menu item in the content menu overlaps that of the application menu.

Next, the operation of the personal computer 10 of the embodiment will now be described.

Figure 4:
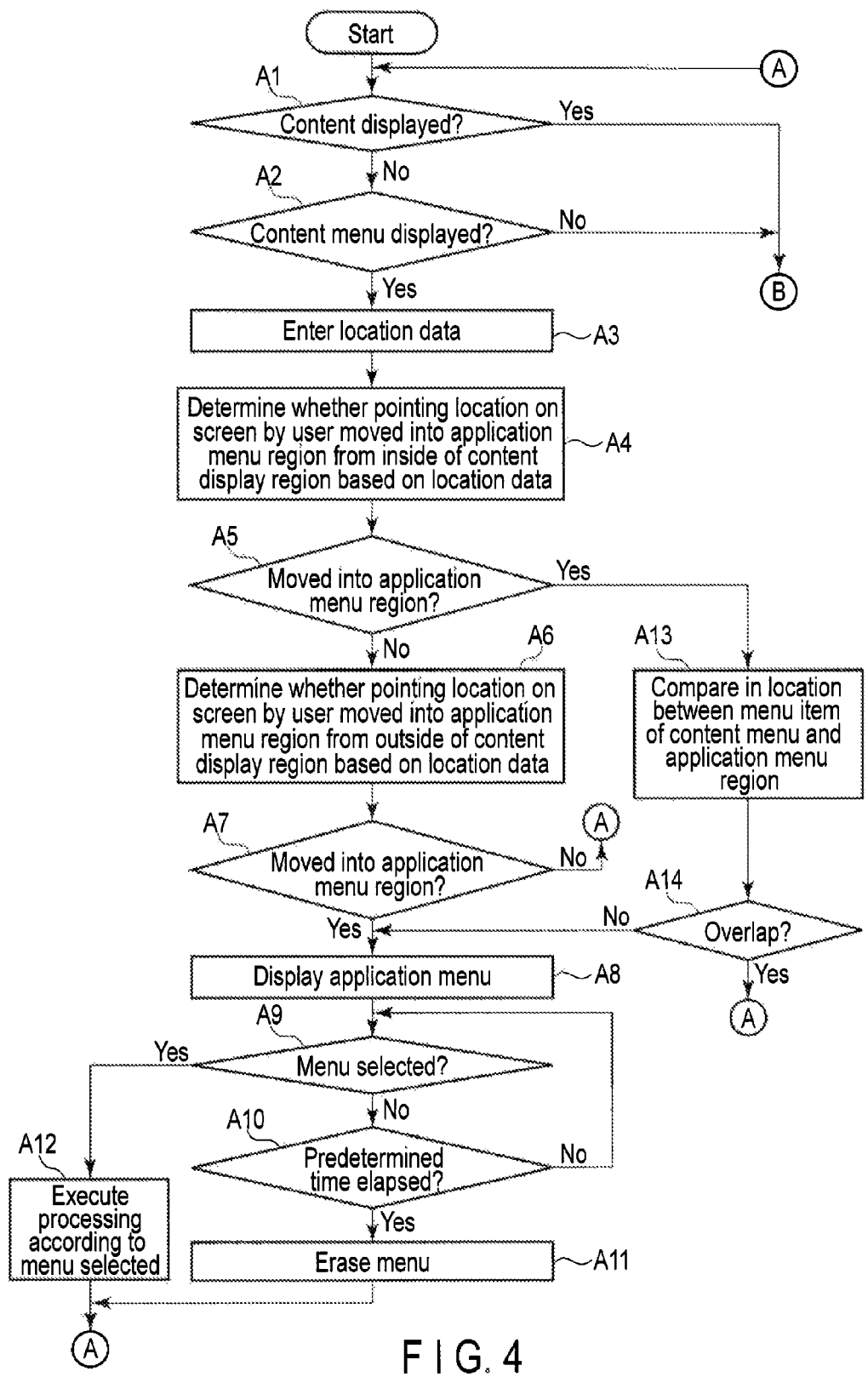
FIG. 4 is an exemplary first flowchart for describing display control of an application menu according to the embodiment.

FIG. 4 and FIG. 5 are each a flowchart for describing display control of the application menu by the application menu display module 211 of the embodiment. The following description is based on the assumption that the user operates the touchpad 14 for selecting a menu item or button on the content menu or application menu. The user is able to move the cursor on the screen of LCD 31A by moving the touch location on the touchpad 14, and instruct execution of the selection by tapping.

The CPU 111 launches the content display program 202 when a Blu-ray or DVD is set on the optical disk drive 118 or a request for reproduction of content is entered by the user's operation.

The CPU 111 executes the content display program 202 to read content data via the optical disk drive 118 and controls the content display controller 210 to reproduce and output the content. The content display controller 210 sets the content display region in the screen of LCD 31A and displays the content on the content display region.

FIG. 6 shows an example of an image on LCD 31A at the start of the content display controller 210 in the embodiment. In the example shown in FIG. 6, the content display controller 210 sets a content display region 314 in a part of a screen 310. On the screen 310, a cursor 312 is displayed, the display location of which is moved according to the operation on the touchpad 14.

In the case where a content (such as the "main part" of a movie) is displayed on the content display region 314 (Yes in block A1) by the content display module 220, the application menu display module 211 does not display the application menu as shown in FIG. 6 unless an entry operation is made on the touchpad 14.

When an entry operation is made on the touchpad 14 to input the location data 231 indicating the touch location (block A15), the application menu display module 211 determines based on the location data 231 whether or not the user's pointing location on the screen 310 is moved into the application region for displaying the application menu (block A16). That is, it is determined whether or not the cursor 312 is moved into the application region by the user's operation on the touchpad 14.

When the cursor 312 is moved into the application region (block A17), the application menu display module 211 displays the application menu in the content display region 314.

FIG. 7 shows an example of an image on the content display region 314 in which the application menu is displayed in the embodiment. In the content display region 314 shown in FIG. 7, a menu bar 316 is provided along an upper side. The menu bar 316 comprises buttons for maximizing the content display region 314 (full-screen display), minimizing the content display region 314, and erasing the content display region 314 (ending the operation of the content display program 202).

The content display region 314 shown in FIG. 7 displays application menus 318 and 319 in two locations. The application menu 318 is displayed along a lower side of the content display region 314 in a region having a predetermined width, whereas the application menu 319 is displayed along an upper side of the content display region 314 in a region having a predetermined width. The regions where the application menus 318 and 319 are displayed are equivalent to application menu regions. The following description is directed to the application menu 318.

Figure 8:
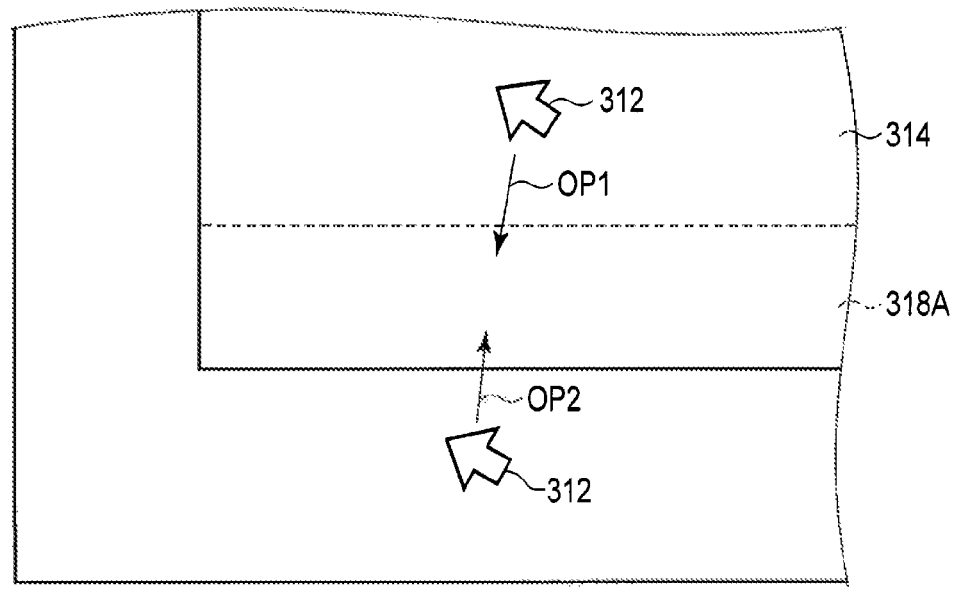
FIG. 8 is an exemplary first diagram showing an example of operation of the embodiment.
Figure 9:
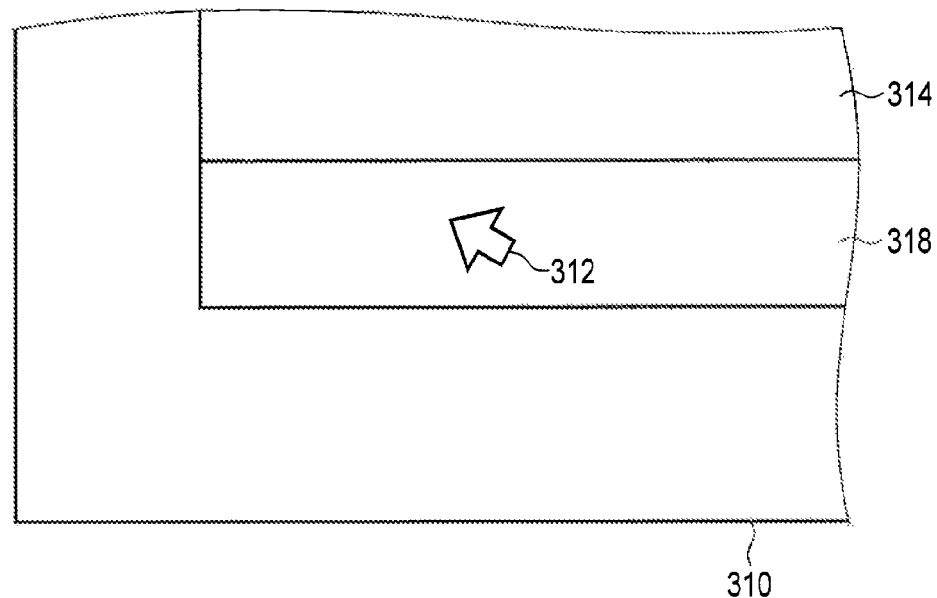
FIG. 9 is an exemplary second diagram showing an example of operation of the embodiment.

In the case where a content is not being displayed on the content display region 314, the application menu display module 211 displays the application menu 318 as shown in FIG. 9 (block A18) in the following situations: a first operation OP1 in which a pointing location (cursor 312) is moved into an application menu region 318A for displaying the application menu 318 from inside of the content display region 314 (first region) as shown in FIG. 8, and a second operation OP2 in which a pointing location (cursor 312) is moved into the application menu region 318A from outside of the content display region 314 as also shown in FIG. 8. Note that when the application menu 318 is being displayed within the content display region 314, the first operation OP1 is to move a pointing location (cursor 312) into the application menu region 318A from an inside portion of the content display region 314 other than the application menu region 318A.

When a button provided in the application menu 318 is selected (for example, the touchpad 14 is tapped while the display location of the cursor 312 is positioned at the button) (Yes in block A19), the application menu display module 211 executes processing corresponding to the selected button (block A22). For example, when the button for instructing fast forward of the content being displayed on the application menu 318, the content display module 220 executes fast forward reproduction of the content.

Note that a button selection is not operated within a predetermined time after the application menu 318 is displayed (Yes in block A20), the application menu display module 211 erases the application menu 318 (block A21). In other words, the content is displayed also in the application menu region 318A.

Incidentally, the application menu display module 211 displays the content menu on the content display region 314 in response to an instruction for displaying the menu by a user's operation (the button on the application menu 318) or at a predetermined timing for displaying the menu for the content.

FIG. 10 is an exemplary diagram showing an example in which the content menu is displayed in the content display region 314 in the embodiment.

The content menu shown in FIG. 10 comprises menu items 320A, 320B, 320C and 320D. Note that the display region of the menu item 320D partially overlaps the application menu region 318A. The menu items 320A to 320D shown in FIG. 10 are indicated by rectangular frames, but may be set by some other display forms. For example, they may be display by display forms such as characters, regions of different colors from that of the surroundings, symbols and figures.

In the case where the content menu is being displayed on the content display region 314 by the content display module 220 as shown in FIG. 10 (Yes in block A2), the application menu display module 211 determines whether the first operation OP1 is performed based on the location data 231 (block A4) when the location data 231 is input according to an operation on the touchpad 14 (block A3). That is, the application menu display module 211 determines whether the pointing location on the screen 310 set by the user has been moved from inside of the content display region 314 to the application menu region 318A.

Here, when it is determined that the first operation was performed (Yes in block A5), the application menu display module 211 compares the location of display of the menu items of the content menu and that of the application menu region 318A with each other to determine whether a menu item and the application menu overlap (block A13). The location of the application menu region 318A in the content display region 314 is predetermined, and the location of display of the menu items of the content menu can be specified by menu display location data contained in the content data.

Here, if any menu item and the application menu overlap (Yes in block A14), the application menu display module 211 does not display the application menu 318.

FIG. 11 is an exemplary diagram showing an example of the case where the first operation OP1 is carried out while the content menu is being displayed in the embodiment. As shown in FIG. 11, when the first operation OP1 is carried out, which moves the cursor 312A displayed in the content display region 314 into the application menu region 318A, the application menu 318 is not displayed. That is, the menu item 320D which overlaps the application menu region 318A in display location, is not hidden by the application menu, and therefore the item can be easily selected by the operation of the cursor 312.

On the other hand, if any menu item and the application menu do not overlap (No in block A14), the application menu display module 211 displays the application menu 318 (block A8). That is, the menu items are not hidden by the application menu if displayed, and therefore the content menu and the application menu 318 are displayed in the content display region 314 so that an operation can be carried out on both menus by the cursor 312.

In the case where the content menu is being displayed on the content display region 314, the application menu display module 211 determines whether the second operation OP2 is performed (block A6). That is, the application menu display module 211 determines whether the pointing location on the screen 310 set by the user with the cursor 312 has been moved from outside of the content display region 314 into the application menu region 318A.

Here, when it is determined that the second operation was performed (Yes in block A7), the application menu display module 211 displays the application menu 318 (block A8). Blocks A9, A10, A11 and A12 shown in FIG. 4 are executed in similar manners to those of blocks A19 to A22, and the descriptions of these blocks will be omitted.

FIG. 12 is an exemplary diagram showing an example of the case where the second operation OP2 is carried out while the content menu is being displayed in the embodiment. As shown in FIG. 12, when the second operation OP2 is carried out, which moves the cursor 312A displayed outside the content display region 314 into the application menu region 318A, the application menu 318 is displayed. That is, even if the menu item 320D overlaps the application menu 318, the application menu 318 is displayed in response to the second operation OP2. Therefore, the operation on the application menu can be facilitated.

Note that only the application menu 318 is discussed in the above-provided descriptions as the object, but display of the application menu 319 as well is controlled in a similar manner to that of the application menu 318. The application menu 319 is displayed when the second operation OP2 is carried out, which moves the cursor 312 from a section above the content display region 314 into the region of the application menu 319 (downward).

Note that in a case where a plurality of application menus 318 and 319 can be displayed in the content display region 314 in the following manner, when one application menu, for example, the application menu 318 is displayed in response to the second operation OP2, another one, the application menu 319 may be displayed at the same time.

FIG. 13 is an exemplary diagram showing an example of the screen 310 in which the application menu 319 is also displayed at the same time when the application menu 318 is displayed in response to the second operation OP2.

If a plurality of application menus 318 and 319 can be displayed, the display of each menu may be controlled individually. For example, when the first operation OP1 or the second operation OP2 is carried out on the application menu region 318A of the application menu 318, the display of only the application menu 318 is controlled in response to this operation. In this case, the application menu 319 does not overlap any item of the content menu, and therefore the display thereof is not inhibited when the first operation OP1 is carried out.

Note that the above-provided descriptions are directed to an exemplified case where the content display region 314 is provided in a part of the screen 310 as shown in FIG. 6. But, for example, when the button for maximizing (full-screen display) the menu bar 316 is selected by the user, the content display controller 210 displays the content display region 314 on the entire screen 310.

In this case, the location of the cursor 312 is managed in a logical display region outside the screen 310 by the OS 201 (or the device driver corresponding to the touchpad 14) although the cursor 312 cannot be displayed outside of the content display region 314 on the screen 310.

FIG. 14 is an exemplary diagram showing an example in which the content display region 314 is displayed on the entire screen 310 in the embodiment.

As shown in FIG. 14, the location of the cursor 312 is managed in a logical display region 330 outside the screen 310. That is, the user can move the cursor 312 to the outside of the screen by operating the touchpad 14. Thus, as shown in FIG. 14, cursor 312C located outside the screen 310 can be moved into the application menu region 318A, and this operation is referred to as a third operation OP3 |, which is the same as the second operation OP2 shown in FIG. 13). In this manner, even if the application menu 318 overlap the menu item 320D of the content menu, it is possible to display the application menu 318 as shown in FIG. 14.

When the user intentionally moves the cursor 312 to the outside of the screen 310 while the content display region 314 being displayed on the entire screen, it is highly probable that the user intends to display the application menu 318. Therefore, the application menu display module 211 may display the application menu 318 when a predetermined time (for example, 1 second) elapsed after moving the cursor 312 to the outside of the screen 310 even without the third operation OP3.

Note that the above-provided descriptions are directed to an exemplified case where the display of the application menu 318 is controlled by operating the cursor 312 with the touchpad 14. But it is alternatively possible that the application menu display module 211 controls display of the application menu 318 by a touch operation with a fingertip, stylus or the like on the touchscreen display 31. For example, in place of moving the cursor 312, a slide gesture (in which a touch location is moved while touching the display) or a flick operation (in which while a touch location is being quickly moved in a direction, removing the touch) may be carried out.

A touch operation on the touchscreen display 31 is detected by touch panel 31B. The application menu display module 211 can determine the movement of the pointing location by the slide or flick gesture based on the entry of the location data 231 indicating the touching operation detected with the touch panel 31B via the OS 201.

When content is displayed on the content display region 314, the application menu display module 211 displays the application menu 318 in response to a slide (or flick) gesture corresponding to the first operation OP1 or the second operation OP2 carried out on the application menu region 318A. Note that the application menu 318 may be displayed when the application menu region 318A is directly touched. Further, in the case where the application menu 318 and a menu item of the content menu do not overlap, the application menu 318 may be displayed when a certain location of the content display region 314 (a region other than the application menu region 318A) is touched.

In the case where the application menu 318 and a menu item of the content menu overlap, the application menu 318 is not displayed even when a slide (or flick) gesture corresponding to the first operation OP1 is carried out on the application menu region 318A. When a slide (or flick) gesture corresponding to the second operation OP2 is carried out from the outside of the content display region 314, the application menu 318 is displayed.

Meanwhile, as shown in FIG. 14, in the case where the application menu 318 is displayed on the screen 310 such that a menu item of the content menu and the application menu region 318A overlap, the application menu 318 is not displayed by the usual touch operation on the content display region 314. In this case, a predetermined touch operation is carried out, that is, for example, a slide (or flick) gesture to outside of the application menu region 318A while touching the application menu region 318A for a predetermined time (for example, 1 second), the application menu 318 is displayed.

As described above, the display of the application menu 319 can be controlled with the touch operation on the touchscreen display 31.

Note that the operation of the cursor 312 with the touchpad 14 and the touch operation on the touchscreen display 31 are described separately above, but when the operation of the cursor 312 and the touch operation can be carried out simultaneously, the processes corresponding to these operations can be executed in parallel.

The above-provided descriptions are directed to an exemplified case where it is determined whether or not a menu item of the content menu contained in a content and an application menu overlap. Besides menu items, any regions provided to enter a user operation (entry), for example, buttons, icons, areas to enter characters, symbols and the like may be subjected to the embodiment. When such regions are displayed, the display of the application menu can be controlled in a similar manner to those described above.

Further, the above-provided descriptions are directed to an exemplified case where content data recorded on a storage medium such as Blu-ray or DVD are read via the ODD 118 and images and the like are reproduced and output, but the embodiment can be applied to such cases where content containing some other content menus is to be displayed, as well. For example, content prerecorded on the HDD 117, television broadcasts received by the television tuner 122, content input from an external device connected to a USB port 22 and content received from an external device by wireless communications via the wireless LAN module 121 can be subjected to the embodiment. In this case, the personal computer 10 comprises a content display program 202 compatible with a corresponding type of content, which displays an application menu corresponding to the content.

Further, the above-provided descriptions are directed to an exemplified case where the application menus 318 and 319 are displayed in a predetermined area of the content display region, that is, for example, areas of certain widths provided along upper and lower sides of the content display region 314 in FIG. 7, but they may be displayed in some other areas. Not only inside the content display region 314, the application menus 318 and 319 may be displayed in areas which partially overlap the content display region 314.

Further, the processing described in the above-described embodiment can be provided in the form of computer-executable programs, which can be written on recording media, for example, magnetic disks (such as flexible disks and hard disks), optical disks (CD-ROMs and DVDs) and semiconductor memories, to be mounted on various types of devices. These programs may be provided to various types of devices by transmission via communication media. A computer reads a program recorded on a recording medium or receives a program via a communication medium, and the program control the corresponding operation of the computer, thus executing the corresponding one of the above-described processes.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising: a display;
a input device; and circuitry configured to:
display an image of a content or a first menu contained in the content in a first region of a screen of the display;
input a pointing location when the input device is operated;
determine whether a first operation is made and whether a second operation is made, the first operation being to move the pointing location from inside of the first region into a second region in which a second menu is to be displayed, the second operation being to move the pointing location from outside of the first region into the second region; and
halt display of the second menu on the second region when the first operation is determined, and display the second menu on the second region when the second operation is determined,
wherein the circuitry is configured to determine whether a third region in which the first menu is located and the second region overlap, and
when the first operation is determined while the first menu is displayed, the circuitry is configured to:
halt display of the second menu when the second region and third region overlap; and display the second menu on the second region when the second region and third region do not overlap.

2. The device of claim 1, wherein the circuitry is configured to display the second menu on the second region, when the second operation is determined while the first menu is displayed.

3. The device of claim 1, wherein the circuitry is configured to locate the first menu on the third region, when the second operation is determined.

4. A menu display method comprising:
displaying an image of a content or a first menu contained in the content in a first region of a screen;
inputting a pointing location when an input device is operated;
determining whether a first operation is made and whether a second operation is made, the first operation being to move a pointing location from inside of the first region into a second region in which a second menu is to be displayed, the second operation being to move a pointing location from outside of the first region into the second region; and
halting display of a second menu on the second region when the first operation is determined, and displaying the second menu on the second region when the second operation is determined,
wherein the method further comprising:
determining whether a third region in which the first menu is located and the second region overlap, and while the first operation is determined while the first menu is displayed, halting display of the second menu when the second region and third region overlap; and
displaying the second menu on the second region when the second region and third region do not overlap.

5. A computer-readable, non-transitory storage medium having stored thereon a computer program which is executable by a computer, the computer program controlling the computer to execute functions of:
displaying an image of a content or a first menu contained in the content in a first region of a screen;
inputting a pointing location when an input device is operated;
determining whether a first operation is made and whether a second operation is made, the first operation being to move the pointing location from inside of the first region into a second region in which a second menu is to be displayed, the second operation being to move the pointing location from outside of the first region into the second region; and
halting display of the second menu on the second region when the first operation is determined, and displaying the second menu on the second region when the second operation is determined,
wherein the computer program controlling the computer further execute functions of:
determining whether a third region in which the first menu is located and the second region overlap, and when the first operation is determined while the first menu is displayed, halting display of the second menu when the second region and third region overlap; and displaying the second menu on the second region when the second region and third region do not overlap.

* * * * *